(12) United States Patent
Watanabe et al.

(10) Patent No.: US 8,274,780 B2
(45) Date of Patent: Sep. 25, 2012

(54) POLARIZABLE ELECTRODE FOR ELECTRIC DOUBLE LAYER CAPACITOR AND ELECTRIC DOUBLE LAYER CAPACITOR USING THE SAME

(75) Inventors: Shin Watanabe, Tokyo (JP); Masayuki Hagiya, Tokyo (JP); Naoya Nishina, Tokyo (JP); Osamu Nakamura, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 169 days.

(21) Appl. No.: 12/679,469

(22) PCT Filed: Sep. 29, 2008

(86) PCT No.: PCT/JP2008/002718
§ 371 (c)(1),
(2), (4) Date: Jun. 30, 2010

(87) PCT Pub. No.: WO2009/041074
PCT Pub. Date: Apr. 2, 2009

(65) Prior Publication Data
US 2010/0265633 A1    Oct. 21, 2010

(30) Foreign Application Priority Data
Sep. 28, 2007 (JP) ................. 2007 256472

(51) Int. Cl.
*H01G 9/00* (2006.01)
(52) U.S. Cl. ........ 361/502; 361/503; 361/504; 361/509; 361/512; 361/516

(58) Field of Classification Search .......... 361/502, 361/503–504, 509–518, 523–529
See application file for complete search history.

(56) References Cited

U.S. PATENT DOCUMENTS

| | | | |
|---|---|---|---|
| 5,143,587 A * | 9/1992 | Endoh et al. .......... 361/504 |
| 6,195,251 B1 | 2/2001 | Suhara et al. | |
| 7,924,548 B2 * | 4/2011 | Yamada et al. ........ 361/502 |
| 2009/0154062 A1 | 6/2009 | Yamada et al. | |

FOREIGN PATENT DOCUMENTS

| | | |
|---|---|---|
| JP | 11-135368 | 5/1999 |
| WO | 2007/094366 | 8/2007 |

OTHER PUBLICATIONS

Chinese Application No. 200880106237.0 Office Action dated May 26, 2011, 10 pages including English translation.

* cited by examiner

*Primary Examiner* — Nguyen T Ha

(57) ABSTRACT

The present invention provides a polarizable electrode for an electrical double layer capacitor which has good high-temperature storage characteristics and can prevent a decrease in electrostatic capacity and increase in internal resistance, and also provides an electrical double layer capacitor using the electrode. A polarizable electrode is formed by mixing Ketjen black, active charcoal and a polytetrafluoroethylene (PTFE) aqueous solution. An etched aluminum foil is used for the collector, and this etched aluminum foil is dipped in a phosphoric acid aqueous solution or an ammonium phosphate or other phosphate aqueous solution to thereby retain 15 to 115 mg/m² of phosphorus on the surface of the etched aluminum foil. The electrostatic capacity per unit area on the surface of this etched aluminum foil is 50 to 350 µF/cm².

5 Claims, 6 Drawing Sheets

POLARIZABLE ELECTRODE FOR ELECTRIC DOUBLE LAYER CAPACITOR AND ELECTRIC DOUBLE LAYER CAPACITOR USING THE SAME

TECHNICAL FIELD

The present invention relates to an electrical double layer capacitor formed by laminating a polarizable electrode, a collector and a separator, and also relates to a polarizable electrode with excellent high-temperature storage characteristics.

BACKGROUND ART

In a conventional electrical double layer capacitor, polarizable positive and negative electrodes each consisting mainly of active charcoal or the like formed as an electrode layer on a collector are arranged facing each other with a separator sandwiched between the two to form the capacitor element. This capacitor element is contained together with an electrolyte solution in a metal case in a container, and insulated with a gasket between the metal case and sealing plate. Alternatively, the capacitor element may be formed by layering a separator between sheet-shaped polarizable electrodes consisting of a pair of positive and negative electrode sheets, and coiling the stacked sheets. This element is then impregnated with an electrolyte solution and contained in a metal case in a container, and the opening of the metal case is sealed with a seal member so that the electrolyte solution does not evaporate.

Such electrical double layer capacitors can be obtained in large quantities by using for the polarizable electrodes a metal with a valve action such as aluminum in the form of a sintered body, etched foil or the like. In other words, it is common to form a capacitor element by coiling a positive electrode foil and negative electrode foil of aluminum or another valve metal with a separator between them.

In such an electrical double layer capacitor, the electrolyte solution is an organic solvent such as propylene carbonate with a quaternary onium salt of boron tetrafluoride or phosphorus hexafluoride dissolved therein as a solute.

However, the moisture contained in the electrolyte solution or the like of such an electrical double layer capacitor produces an alkaline component by electrolysis at the negative electrode during aging. This alkaline component dissolves the oxide coat on the surface of the aluminum foil of the collector for example, and since the potential of the negative electrode during discharge is thus nobler than the solution potential of Al, the following reaction occurs within the collector.

$$Al \rightarrow Al^{3+} + 3e^-$$ [C1]

The problem has been that this reaction is accelerated in particular when F— or the like is present as a hydrolysis product of the $BF_4^-$ anion used in the electrolyte, and since anionic compounds are formed at the same time, these compounds are electrolyzed and accumulate on the positive electrode. Thus, when such an electrical double layer capacitor is stored at high temperatures, the electrical properties deteriorate, with decreased electrostatic capacity and increased internal resistance.

The electrostatic capacity of a capacitor is affected by the type of insulating film formed on the electrode surface, the thickness of the electrode double layer and the surface area of the electrode, with electrostatic capacity being inversely proportional to the thickness of the electrode double layer. When the internal resistance of the capacitor is high, moreover, there is the possibility of a so-called IR drop, in which the voltage declines dramatically at the initial stage of discharge as the current density rises.

To solve such problems, an electrical double layer capacitor has been proposed whereby a rise in internal resistance can be prevented even during high-temperature no-load storage by improvements in the electrolyte solution (Patent Document 1). Specifically, an electrolyte solution is used having a tetrafluoroborate salt of quaternary ammonium as the solute and a mixture of γ-butyrolactone and propylene carbonate as the solvent.

Patent Document 1: Japanese Patent Application Laid-open No. 2003-109861

However, even the electrical double layer capacitor with improved electrolyte solution described in Patent Document 1 above has not succeeded in satisfactorily addressing the problem of decreased electrostatic capacity and increased internal resistance during storage in a high-temperature environment.

DISCLOSURE OF THE INVENTION

It is an object of the present invention, which is proposed as a means of solving the aforementioned problems, to provide a polarizable electrode for an electrical double layer capacitor and an electrical double layer capacitor using this electrode whereby high-temperature storage characteristics are improved and decreased electrostatic capacity and increased internal resistance can be prevented.

To achieve this object, the present invention features a collector having 15 to 115 $mg/m^2$ of phosphorus retained on the surface thereof. The retained amount of phosphorus on the collector in this case is assayed by spectrophotometric analysis of a solution obtained by dissolving the phosphorus retained on the collector in acid.

In a preferred embodiment, the collector is an etched aluminum foil.

The present invention can also be an electrical double layer capacitor using the aforementioned polarizable electrode for an electrical double layer capacitor.

Using such a polarizable electrode in which the collector is an etched aluminum foil with a specific amount of phosphorus retained on the surface thereof, and an electrical double layer capacitor using the same, the oxide film generated on the collector surface is more stable, and it is possible to control the reaction of [C1] above and the consequent accumulation of anionic compounds. This results in better electrical characteristics after a high-temperature storage test.

In a preferred embodiment, the electrostatic capacity per unit area of the collector is 50 to 350 $\mu F/cm^2$.

In order to achieve good electrical characteristics after a high-temperature storage test with a polarizable electrode having a specific amount of retained phosphorus as described above and an electrical double layer capacitor using the same, the electrostatic capacity per unit area of the collector must have an optimal value of 50 $\mu F/cm^2$ and a tolerance value of 350 $\mu F/cm^2$.

If the electrostatic capacity is less than 50 $\mu F/cm^2$, the surface area of the collector is reduced and less phosphorus adheres to the surface, greatly detracting from the desirable electrical characteristics achieved by the present invention. If the electrostatic capacity exceeds 350 $\mu F/cm^2$, on the other hand, the surface area of the etched aluminum foil is increased, promoting the reaction of [C1] above and resulting in greater accumulation of anionic compounds. The electrical characteristics may deteriorate as a result. Therefore, the electrostatic capacity per unit area of the collector must be 50 to 350 µF/cm².

With the invention thus described, it is possible to provide a polarizable electrode with good electrical characteristics and an electrical double layer capacitor using this polarizable electrode whereby loss of electrostatic capacity and increased internal resistance can be prevented even during storage under high-temperature conditions.

BEST MODE FOR CARRYING OUT THE INVENTION

Figure 1:
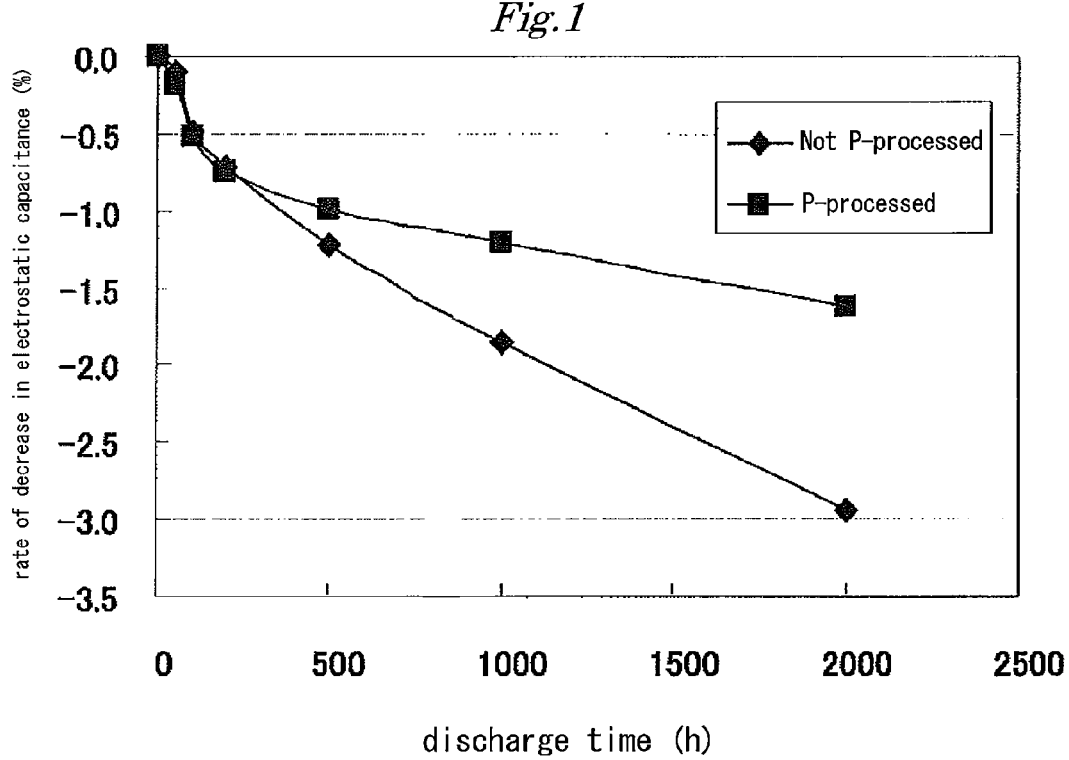
FIG. 1 is a comparison chart of capacity reduction rates using Example 1 and Comparative Example 1 in an embodiment of the present invention.

Next, the best mode for carrying out the invention (hereunder, this mode) is explained.
(1) Electrical Double Layer Capacitor
(1-1) Polarizable Electrode First, the materials of the polarizable electrode for an electrical double layer capacitor of this mode are explained. The polarizable electrode is composed of a polarizable electrode material, a conductive auxiliary and a binder.

Active charcoal, polyacene and the like are examples of polarizable electrode materials used for the positive and negative electrodes. Phenol resin or other resinous carbon, coconut husks or other plant-based carbon, coal or petroleum pitch coke, mesocarbon microbeads (MCMB) or the like can be activated and used as the active carbon.

Methods for activating the active carbon include steam activation, alkali activation, zinc chloride activation, electrical field activation and the like, or a suitable combination of such activation methods can be used.

Ketjen black, acetylene black, natural or artificial graphite and the like can be used as conductive auxiliaries, while polytetrafluoroethylene (PTFE), vinylidene polyfluoride, carboxyalkyl cellulose, alkyl cellulose, fluoroolefin copolymer-crosslinked polymer, polyvinyl alcohol, polyvinyl pyrrolidone, polyacrylic acid, polyimide, natural latex, styrene butadiene rubber (SBR), acrylic rubber, nitrile butadiene rubber (NBR), butyl rubber (IIR) latex and the like can be used as binders. Isopropyl alcohol (IPA) and other lower alcohols can be used for agitating the polarizable electrode material and conductive auxiliary.

Aluminum foil, stainless steel foil or the like can be used for the collectors, but etched aluminum foil is used in this mode. The reason the aluminum foil is etched is to increase the effective surface area by forming bumps and dips by the etching process because the electrostatic capacity of the capacitor is proportional to the surface area of the electrode.

A feature of this embodiment is that 15 to 115 mg/m² of phosphorus is retained on the collector—the aforementioned etched aluminum foil—, which is affixed to the polarizable electrode material of the negative electrode. Specifically, this etched aluminum foil is dipped in a phosphoric acid aqueous solution or ammonium phosphate or other phosphate salt aqueous solution to cause 15 to 115 mg/m² of phosphorus to be retained on the surface of the etched aluminum foil and thereby prevent dissolution of the oxide film formed on the surface of this aluminum foil.

A foil having an electrostatic capacity of 50 to 350 µF/cm² is used as this etched aluminum foil.

Reducing the electrostatic capacity is the same as reducing the relative surface area of the etched aluminum foil, so the smaller the capacity the more the reaction of [C1] above can be suppressed, thereby preventing deterioration of the electrical characteristics. Unless 50 µF/cm² or more, however, less phosphorus adheres to the surface of the aluminum foil. When the amount of adhering phosphorus is too low the specific electrical characteristics of this embodiment cannot be obtained, and there is much less reduction in the rates of decrease in electrostatic capacity and increase in internal resistance.

On the other hand, if the electrostatic capacity exceeds 350 µF/cm² the specific surface area of the etched aluminum foil will be to great, promoting the aforementioned reaction [C1] of Al and increasing the accumulation of anionic compounds, which detracts from the electrical characteristics, so an etched aluminum foil with an electrostatic capacity of 350 µF/cm² or less is adopted.

(1-2) Electrolyte Solution

For the electrolytes in the electrolyte solution, tetraethylammonium, triethylmethylammonium and other quaternary ammonium salts, N-ethyl-N-methylpyrrolidinium, N,N-tetramethylene pyrrolidinium and other aliphatic cyclic ammonium salts and 1,3-dimethylimidazolium, 1-ethyl-3-methylimidazolium and other quaternary imidazoliums for example can be used as cations. $BF_4^-$, $B(C_5H_5)_4^-$, $B(C_2O_4)_2^-$, $B(C_6H_5)_4^-$ or the like for example can be used as anions, as can $PF_6^-$, $SbF_6^-$, $AsF_6^-$, $CF_3SO_3^-$, $C(CF_3SO_2)_3^-$, $C_4F_9SO_3^-$, $C_8F_{17}SO_3^-$, $N(CF_3SO_2)_2^-$ and the like for example. Since F— is thought to participate in reaction [C1], the effects of the present invention are notable when using an anion containing F.

Solvents such as the following can be used. Each of these solvents can be used alone, or a mixture of 2 or more can be used. Examples include propylene carbonate, propylene carbonate derivatives, ethylene carbonate, ethylene carbonate derivatives, butylene carbonate, dimethyl carbonate, diethyl carbonate, ethylmethyl carbonate, γ-butyrolactone, 1,3-dioxolane, dimethylsulfoxide, sulfolane, formamide, dimethylformamide, dimethylacetamide, dioxolane, phosphate triester, maleic acid anhydride, succinic acid anhydride, phthalic acid anhydride, 1,3-propane sultone, 4,5-dihydropyran derivatives, nitrobenzene, 1,3-dioxane, 1,4-dioxane, 3-methyl-2-oxazolidinone, 1,2-dimethoxyethane, tetrahydrofuran, 2-methyl tetrahydrofuran, tetrahydrofuran derivatives, sydnone compounds, acetonitrile, nitromethane, alkoxyethane, toluene and the like.

(1-3) Separator

The separator may be a porous polyethylene membrane, polypropylene nonwoven cloth, glass fiber nonwoven cloth, cellulose specialty paper or the like for example.

EXAMPLE 1

As an example, the polarizable electrodes used in Example 1 are formed by mixing Ketjen black, active charcoal and a polytetrafluoroethylene (PTFE) aqueous solution. Specifically, Ketjen black, active charcoal and isopropyl alcohol (IPA) are agitated together, and a polytetrafluoroethylene (PTFE) aqueous solution is mixed with this solution to prepare a slurry.

The resulting slurry is rolled to about 150 μm with a roller to prepare a sheet. Collectors consisting of etched aluminum foil provided with connection terminals are then attached with a carbon adhesive to one side each of two sheet-shaped polarizable electrodes formed from Ketjen black, active charcoal and polytetrafluoroethylene (PTFE) to form positive and negative polarizable electrodes.

The two sheet-shaped polarizable electrodes, positive and negative, are then arranged so that the sides without the attached etched aluminum foils are facing each other, and coiled with a cellulose separator in between to form an electrical double layer capacitor element.

This electrical double layer capacitor element is then impregnated with a 1 M tetraethylammonium tetrafluoroborate/propylene carbonate solution (1 M TEABF4/PC) as the electrolyte solution.

This element was then inserted into a cylindrical aluminum case with an open end and sealed with a seal member, and the connection terminals of the etched aluminum foils of the polarizable electrodes were joined to the external terminals of the seal member. This was then aged by application of voltage and discharged to prepare an electrical double layer capacitor cell. The cell was Φ35×50 L in size.

In Example 1, the etched aluminum foils of the collectors attached to the polarizable electrodes have been dipped in a phosphoric acid aqueous solution or an ammonium phosphate or other phosphate salt aqueous solution to thereby retain 60 mg/m$^2$ of phosphorus on the surface of the etched aluminum foils. The electrostatic capacity per unit area of the etched aluminum foil surfaces is 170 μF/cm$^2$.

EXAMPLE 2

The polarizable electrodes used in Example 2 are prepared by mixing Ketjen black, active charcoal, carboxymethyl cellulose (CMC) and acrylic elastomer resin. Specifically, Ketjen black and active charcoal are agitated in a carboxymethyl cellulose (CMC) aqueous solution, and acrylic elastomer resin is mixed with this solution to prepare a slurry.

The resulting slurry is then applied with an applicator to both sides of an etched aluminum foil to a dried thickness of 160 μm on each coated side, to prepare a sheet. This sheet was roll pressed to a coat thickness of 150 μm on each side, and provided with connection terminals to form positive and negative polarizable electrodes.

Two sheet-shaped polarizable electrodes, positive and negative, were arranged facing each other and coiled with a cellulose separator between the two to prepare an electrical double layer capacitor element.

This electrical double layer capacitor element was impregnated with a 1.8 M triethylmethylammonium tetrafluoroborate/gammabutyrolactone solution (1.8 M TEMABF4/GBL) as the electrolyte solution.

This element was then inserted into a cylindrical aluminum case with an open end and sealed with a seal member, and the connection terminals of the etched aluminum foils of the polarizable electrodes were joined to the external terminals of the seal member. After being aged by application of voltage this was discharged to prepare an electrical double layer capacitor cell. The cell was Φ35×50 L in size.

In this Example 2, the etched aluminum foils which were the collectors attached to the polarizable electrodes had been dipped in a phosphoric acid aqueous solution or ammonium phosphate or other phosphate aqueous solution to retain 55 mg/m$^2$ of phosphorus on the surface of the etched aluminum foils. The electrostatic capacity per unit area of the etched aluminum foil surfaces was 186 μF/cm$^2$.

CONVENTIONAL EXAMPLE 1

An electrical double layer capacitor was prepared using the same materials as in Example 1 except that no phosphorus was carried on the etched aluminum foils of the collectors. In this case, the electrostatic capacity per unit area of the etched aluminum foils was also 170 μF/cm$^2$.

Conventional Example 2

An electrical double layer capacitor was prepared using the same materials as in Example 2 except that no phosphorus was carried on the etched aluminum foils of the collectors. In this case, the electrostatic capacity per unit area of the etched aluminum foils was also 186 μF/cm$^2$.

[Measurement Methods]

The method used here for measuring the electrostatic capacity per unit area of the etched aluminum foils was to dip the etched aluminum foils in a mixed solution of phosphoric acid and chromic acid to remove the oxide film from the surface of the etched foils and form a chromate film, after which electrostatic capacity was measured with roughly the same level of film adhesion. Thus, the measured electrostatic capacity can be used as an indicator of the specific surface area of the etched aluminum foils.

The amount of phosphorus retained on the surface of the etched aluminum foils (collectors) was assayed by spectrophotometric methods using a solution of the etched aluminum foil dissolved in acid.

[Comparative Results]

EXAMPLE 1 and CONVENTIONAL EXAMPLE 1

Figure 2:
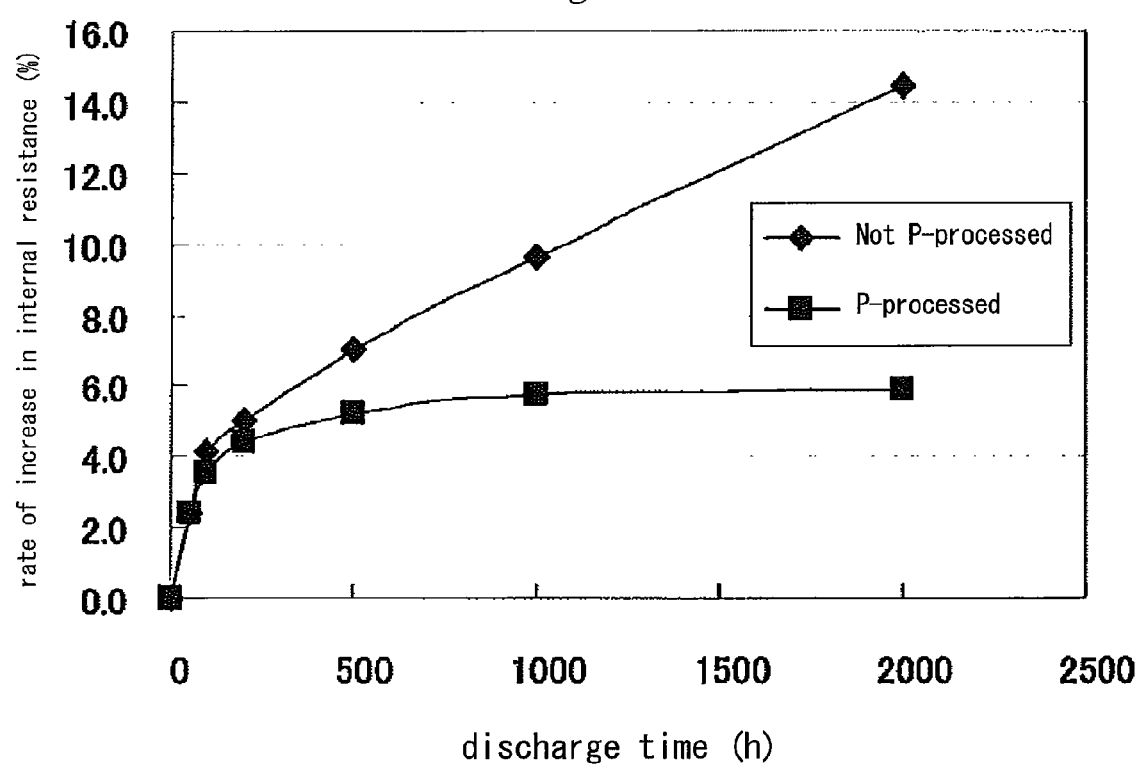
FIG. 2 is a comparison chart of internal resistance increase rates using Example 1 and Comparative Example 1 in an embodiment of the present invention.

The electrical characteristics of the electrical double layer capacitors of Example 1 and Conventional Example 1 obtained by the aforementioned methods were determined by no-load storage testing at 60° C. as shown by the rate of decrease in electrostatic capacitance and the rate of increase in internal resistance in FIGS. 1 and 2. FIG. 1 is a graph comparing the results for decrease in electrostatic capacity in Example 1 and Conventional Example 1, while FIG. 2 is a graph comparing the increase in internal resistance in Example 1 and Conventional Example 1.

As shown in FIG. 1 and FIG. 2, the electrical double layer capacitor having 60 mg/m$^2$ of phosphorus retained on the etched aluminum foil of the collector had a lower rate of decrease in electrostatic capacity and a lower rate of increase in internal resistance in comparison with the electrical double layer capacitor having etched aluminum foils without phosphorus.

For example, after 1000 hours of discharge time the decrease in electrostatic capacity was 1.9% in Conventional Example 1 but 1.2% in Example 1. The increase in internal resistance was 9.6% in Conventional Example 1 but 5.8% in Example 1. After 2000 hours of discharge, the decrease in electrostatic capacity was 2.9% in Conventional Example 1 but 1.6% in Example 1. The increase in internal resistance was 14.5% in Conventional Example 1 but 5.9% in Example 1.

The measurement results also showed that the amount of retained phosphorous adhering to the collector needed to be 15 to 115 mg/m$^2$ in order to obtain good electrical characteristics with a decrease in electrostatic capacity and increase in internal resistance sufficiently lower than those obtained in Conventional Example 1.

That is, if the amount of phosphorus is more than 115 mg/m$^2$ the layer of phosphorus formed on the etched aluminum foil forms an insulating film that increases the internal resistance so that the desirable electrical characteristics of this embodiment of the invention cannot be obtained. If the amount of phosphorus is less than 15 mg/m$^2$, on the other hand, there is a significant reduction in the electrical characteristics specific to this embodiment of the invention, which are obtained by carrying phosphorus on the collector, and the loss of electrostatic capacity and increase in internal resistance cannot be reduced by the specified amounts. As a result, the amount of adhering phosphorus carried on the collector is limited within the specific range of 15 to 115 mg/m$^2$.

As discussed above, a foil with an electrostatic capacity of 50 to 350 μF/cm$^2$ is used for the etched aluminum foil carrying 15 to 115 mg/m$^2$ of phosphorus.

This is because if the electrostatic capacity is less than 50 μF/cm$^2$ less phosphorus will adhere to the surface of the etched aluminum foil, and there will be much less reduction in the loss of electrostatic capacity and increase in internal resistance in this embodiment of the invention. If the electrostatic capacity exceeds 350 μF/cm$^2$, on the other hand, the specific surface area of the etched aluminum foil will be too large, and more anionic compounds will accumulate as a result of the above reaction [C1] of Al, detracting from the electrical characteristics.

The reason that the electrical double layer capacitor having 15 to 115 mg/m$^2$ of phosphorus retained on the etched aluminum foil of the collectors had less loss of electrostatic capacity and less increase in internal resistance than the conventional electrical double layer capacitor without carried phosphorus is believed to be as follows.

As discussed above, an electrical double layer capacitor contains moisture in the electrolyte solution and the like, and this moisture is electrolyzed at the negative electrode during aging, producing an alkaline component. The oxide film on the surface of the etched aluminum foil of the collector is dissolved by this alkaline component, promoting reactions such as that of [C1] above inside the collector during discharge.

As a result, anionic compounds are formed from the $BF_4^-$ anion of the electrolyte, and during measurement of electrostatic capacity and internal resistance, these compounds are electrolyzed and accumulate on the positive electrode, detracting from the electrical characteristics. In the present invention, however, because a specific amount of phosphorus is retained on the etched aluminum foil of the collector, the oxide film that forms on the collector surface is more stable, inhibiting the reaction of [C1] above and the resulting accumulation of anionic compounds. This results in good electrical characteristics after high-temperature storage testing.

EXAMPLE 2 and CONVENTIONAL EXAMPLE 2

Figure 3:
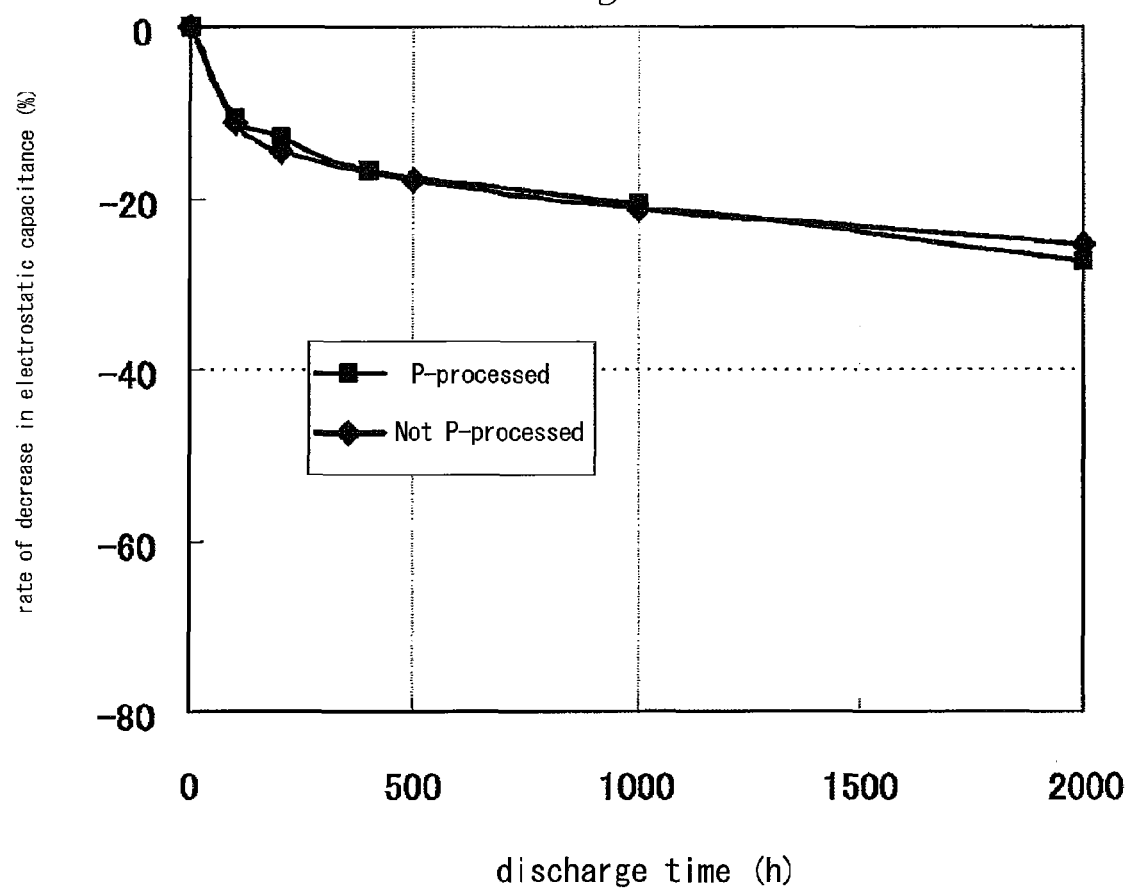
FIG. 3 is a comparison chart of capacity reduction rates using Example 2 and Comparative Example 2 in an embodiment of the present invention.
Figure 4:
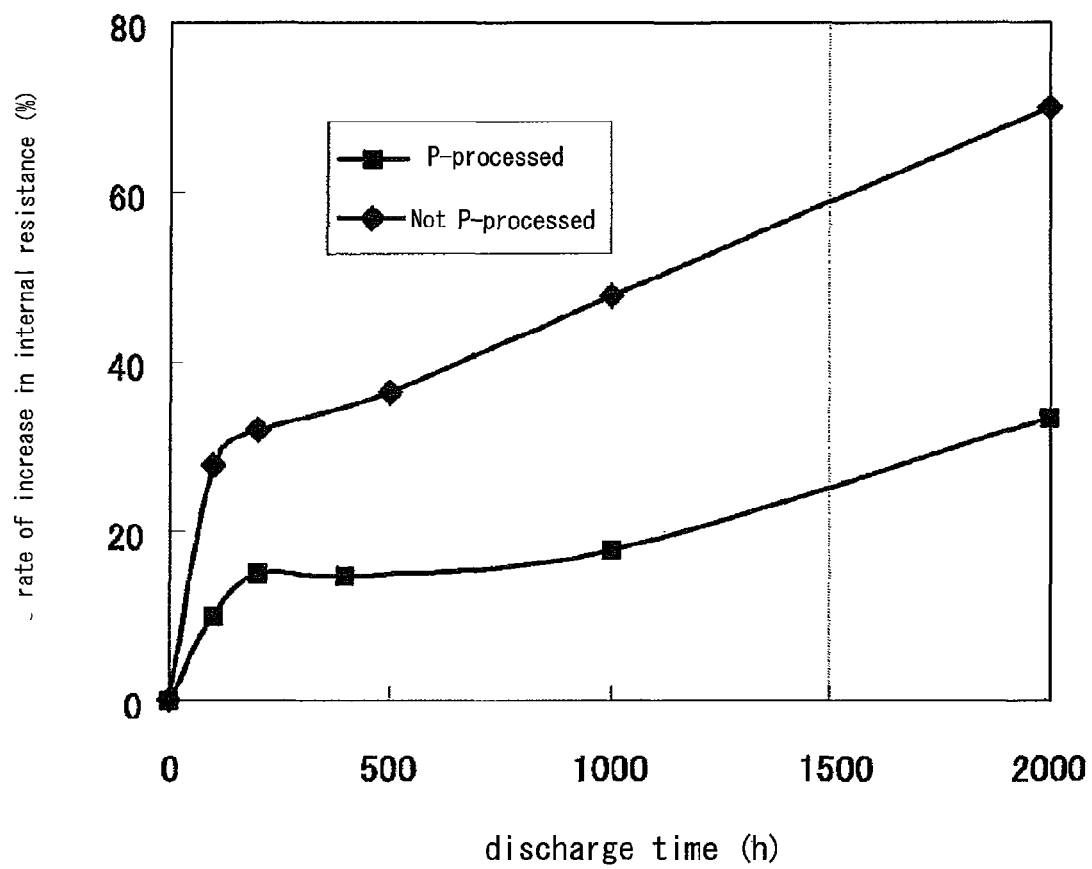
FIG. 4 is a comparison chart of internal resistance increase rates using Example 2 and Comparative Example 2 in an embodiment of the present invention.
Figure 5:
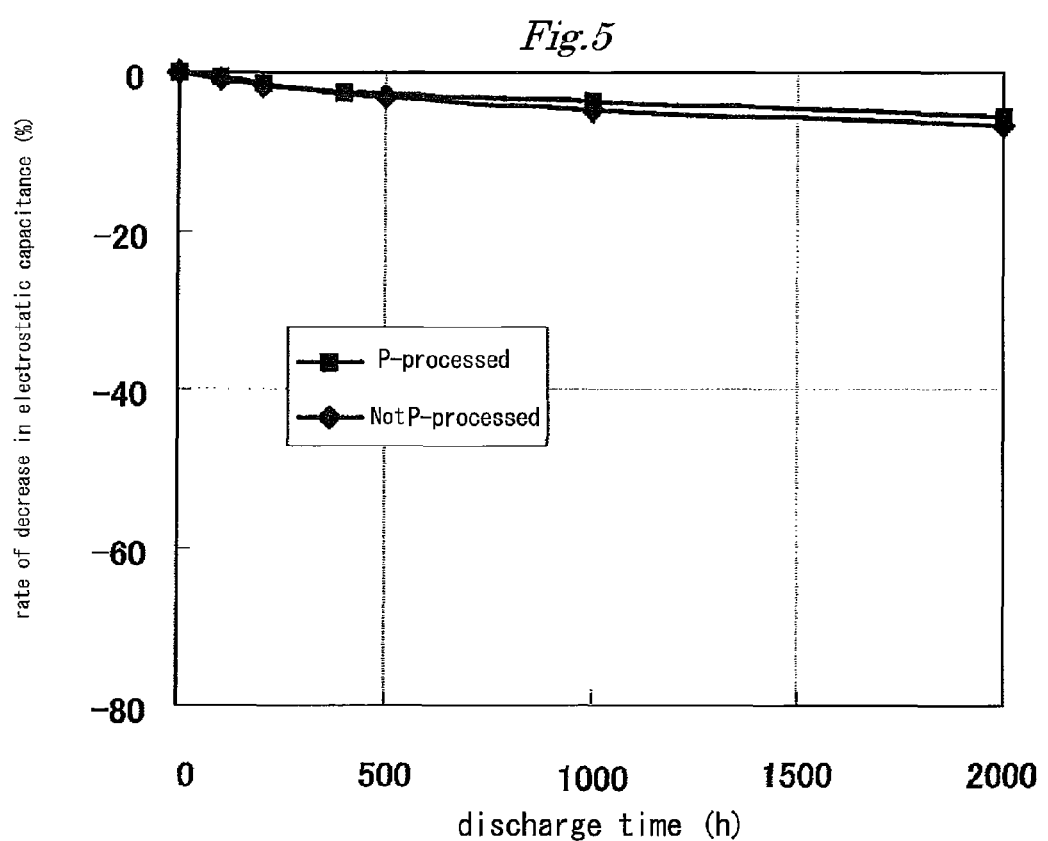
FIG. 5 is a comparison chart showing capacity reduction rates using Example 2 and Comparative Example 2 in an embodiment of the present invention (85° C. no-load storage test).
Figure 6:
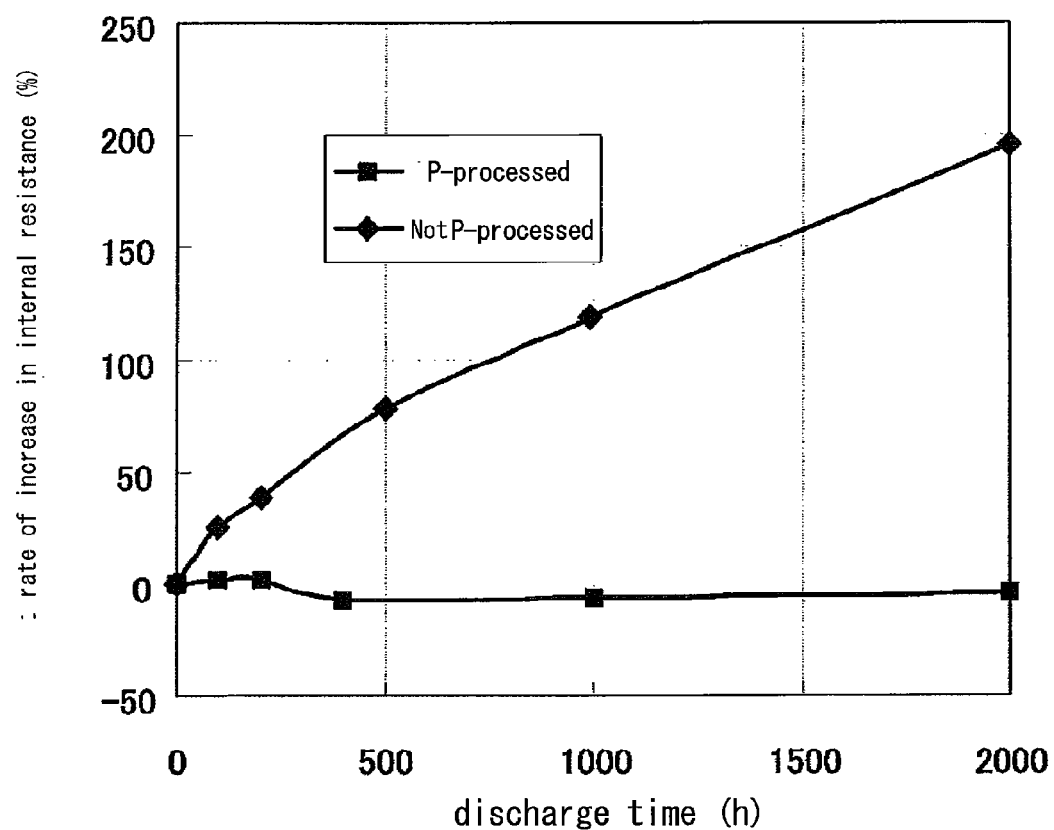
FIG. 6 is a comparison chart of internal resistance increase rates using Example 2 and Comparative Example 2 in an embodiment of the present invention (85° C. no-load storage test).

The electrical characteristics of the electrical double layer capacitors of Example 2 and Conventional Example 2 obtained by the aforementioned methods were determined by 2.3 V load testing at 85° C. and no-load storage testing at 85° C. as shown by the rates of decrease in electrostatic capacity and the rates of increase in internal resistance in FIGS. 3 through 6. FIG. 3 is a chart comparing the results for rate of decrease in electrostatic capacity in Example 2 and Conventional Example 2 in a 2.3 V load test at 85° C., while FIG. 4 is a graph comparing the rate of increase in internal resistance in Example 2 and Conventional Example 2 in a 2.3 V load test at 85° C. FIG. 5 is a graph comparing the results for rate of decrease in electrostatic capacity in Example 2 and Conventional Example 2 in a no-load storage test at 85° C., while FIG. 6 is a graph comparing the rate of increase in internal resistance in Example 2 and Conventional Example 2 in the same no-load storage test at 85° C.

As shown by FIGS. 4 and 6, an electrical double layer capacitor with 55 mg/m$^2$ of phosphorus retained on the etched aluminum foil of the collector had a much lower increase in internal resistance than an electrical double layer capacitor having an etched aluminum foil without retained phosphorus in both a 2.3 V load test and a no-load storage test at 85° C.

For example, after a load time or storage time of 100 hours the increase in internal resistance was 27.68% in Conventional Example 2 but only 9.87% in Example 2. After 1000 hours, the increase was 47.84% in Conventional Example 2 but 17.88% in Example 2, while after 2000 hours it was 69.91% in Conventional Example 2 but 33.33% in Example 2, a dramatic difference between the two in terms of increase in internal resistance.

As shown in FIGS. 3 and 5, on the other hand, there was little difference in loss of electrostatic capacity in a 2.3 V load test and no-load storage test at 85° C. between an electrical double layer capacitor carrying 55 mg/m$^2$ of phosphorus on the etched aluminum foil and an electrical double layer capacitor having etched aluminum foil without carried phosphorus. Thus, good characteristics were obtained at 85° C., at which open-valve operation is impossible because of gas produced by decomposition when using propylene carbonate.

The reason why the increase in internal resistance was lower in Example 2 than in Conventional Example 2 may be that as in Example 1 and Conventional Example 1 above, adhesion of crystal water on the surface of the etched aluminum foil is suppressed in Example 2 because the aluminum etched foil has been treated with phosphoric acid, thereby suppressing occurrence of F— as a hydrolysis product of this water with the $BF_4^-$ anion, and making it possible to control corrosion of the etched aluminum foil. When F— occurs as a hydrolysis product of the $BF_4^-$ anion used in the electrolyte, the reaction of [C1] above is accelerated, and anionic compounds form which contribute to an increase in internal resistance.

For the same reasons discussed under "Example 1 and Conventional Example 2" above, the amount of carried phosphorus for obtaining good electrical characteristics with a lower rate of increase in internal resistance than in Conventional Example 2 is 15 to 115 mg/m$^2$. In Example 2, moreover, a foil with an electrostatic capacity of 50 to 350 μF/cm$^2$ is used as the etched aluminum foil carrying 15 to 115 mg/m$^2$ of phosphorus. The reasons are the same as in Example 1. In Example 1, results equivalent to those of Example 1 could be obtained using a coated electrode as in Example 2. In Example 2, similarly, results equivalent to those of Example 2 could be obtained using a sheet electrode as in Example 1.

The invention claimed is:

1. A polarizable electrode for an electrical double layer capacitor, having a collector with 15 to 115 mg/m2 of phosphorus retained on the surface thereof.

2. The polarizable electrode for an electrical double layer capacitor according to claim 1, wherein said collector is an etched aluminum foil.

3. The polarizable electrode for an electrical double layer capacitor according to claim 1, wherein the electrostatic capacity per unit area of the collector is 50 to 350 μF/cm$^2$.

4. An electrical double layer capacitor using the polarizable electrode for an electrical double layer capacitor according to claim 1.

5. In a high-temperature electrical double layer capacitor, the improvement comprising:

a sheet collector of an etched aluminum foil with an electrostatic capacity of 50 to 350 μF/cm$^2$ has 15 to 115 mg/m$^2$ of phosphorous retained on a collecting surface of the collector wherein at a temperature of 85° C. and a 2.3 volt load the increase in internal resistance after 2,000 hours of service was approximately 33.33% greater than an initial internal resistance.

* * * * *